Patented Mar. 14, 1939

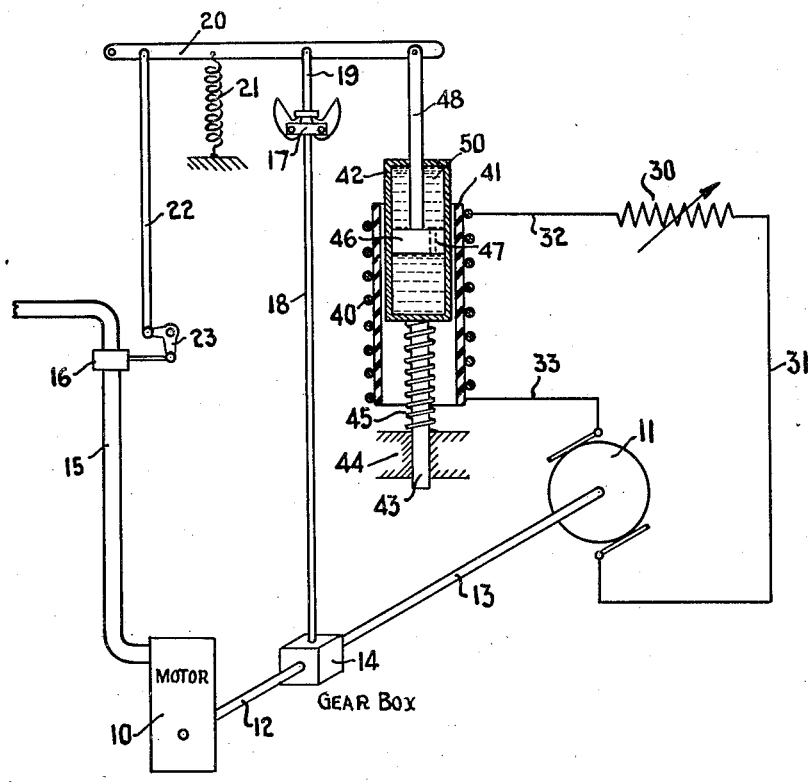

2,150,294

UNITED STATES PATENT OFFICE 2,150,294

SPEED REGULATING MEANS FOR DIRECT CURRENT GENERATOR UNITS

Vernon Roosa, Dobbs Ferry, and Eugene Silber, New York, N. Y.

Application December 8, 1937, Serial No. 178,828

4 Claims. (Cl. 290—40)

This invention relates to means for controlling the speed of units comprising prime movers and direct current generators, and more especially to means for accelerating the speed of units of this character in a manner directly proportional to, and instantaneously actuable by, increases in the electrical load upon said generators.

It is an object of the present invention to provide a speed control of the character indicated wherein means are included associated with the loaded electrical circuit and power transmission network connected to said generator whereby the speed of the generator can be accelerated substantially instantaneously by, and to an extent at least generally proportional to, variations and especially to increases in the electrical load in the current transmission network.

It is also among the more important objects of the present invention to provide a speed control unit adapted to regulate the speed of a prime mover, which is characterized in that the usual speed control means of the prime mover, viz., governor and associated apparatus, is adapted to independently control the speed of the prime mover prior and subsequent to its control by the device according to the present invention. In other words, the device according to the present invention functions intermittently and in conjunction with the usual speed control means of a prime mover, augmenting same and to a great extent increasing the utility of the prime mover-generator combination by at least largely minimizing the time interval or lag which usually lapses between variations in electrical load of the generator and alterations in the speed of the prime mover connected therewith.

In at least most of the generating plants now in use, that is to say small units comprising generator and prime mover, means are not provided for altering the speed of the prime mover except through apparatus actuated by and associated with centrifugally controlled governors. Hence, when electrical loads are applied to the output of the generator a correspondingly greater counter-torque is imposed upon the prime mover, this counter-torque or load being reflected, of course, in decrease in the speed of the prime mover. As the speed of the prime mover is diminished, the apparatus associated with the centrifugal governor increases the speed of the prime mover. Thus it will be seen that the speed of the prime mover is not increased until its speed has been decreased, thereby causing appreciable fluctuation in the current supplied to the electrical transmission network associated with the generator. As hereinbefore referred to, it is among the major objects of the present invention to at least largely minimize this time lag.

It is notable among the advantages of the device according to the present invention that the speed control means so prepared is especially adapted to substantially instantaneously alter the speed of the prime mover when momentary or intermittent loads are placed upon the electrical transmission network associated with the generator and that although this control, as hereinbefore mentioned, functions intermittently whereby the speed of the prime mover is substantially increased almost simultaneously with the application of the additional load, that the control means normally rides free of and is substantially dissociated from the prime mover, the latter being normally controlled by the usual speed regulating means including a centrifugal governor.

It is also among the features of the device according to the present invention that it comprises a relatively small number of parts few of which are subject to wear or deterioration, whereby both the initial cost and cost of upkeep is minimized.

In order to facilitate a more complete understanding of the matter of the present invention, a certain specific embodiment thereof will be hereinafter described and is illustrated in the accompanying drawing, but it is to be clearly understood that the embodiment illustrated and described is provided merely by way of example and is non-limitative.

The acompanying drawing illustrates substantially diagrammatically a preferred embodiment of the matter of the present invention.

Regarded in certain of its broader aspects the present invention comprises interposing an electrically conductive helix in a loaded electrical transmission network connected in series with generator and electrical load whereby all current passing to the network must pass through said helix. Within the helix an electro-magnetically sensitive plunger is supported associated with the throttle control arm of the prime mover whereby alterations in current flowing through the network, caused by variations in the electrical load, are reflected in forces tending to alter the relative position of the core within the helix and tending to move same coaxially of the helix. It will be apparent that tendencies of movement of said core are substantially concurrent with alterations in the electrical load on the network inasmuch as imposition of additional electrical load on the network is normally reflected in an increase in the current flowing therein, whereby the electro-magnetic field within the helix is altered with concomitant alteration in the forces tending to move the core coaxially within the helix.

In the preferred embodiment of the present invention the electro-magnetically sensitive core within the helix is associated with the throttle control arm by means which permit substantially slow and gradual movement of the core without affecting the speed control means but which, in the event of sudden or quick movement of the core, substantially instantaneously actuates the throttle control to an extent at least proportional to movement or variation in position of said core.

The attached drawing, included in and made part of the specification, is substantially a schematic circuit diagram shown together with associated conventional types of mechanism according to the now preferred embodiment of the present invention.

In order to assist in an understanding of the present invention the illustrated embodiment thereof will now be described. In the drawing the numeral 10 designates generally a prime mover associated with a direct current generator generally designated at 11 by means including shafts 12 and 13 and gear box 14. The prime mover 10 is associated with a fuel supply (not shown) by means including a supply line 15 provided with a throttle control 16 substantially as diagrammatically illustrated.

The speed of the prime mover is normally maintained substantially constant by means including a centrifugal governor 17 mounted on a shaft 18 and connected through the gear box 14 to the drive shaft of the prime mover. The centrifugal governor 17, by means of a connecting member 19, moves a lever arm 20 against tension in the spring 21 and thereby actuates the throttle 16 by means including connector members 22 and 23. In this manner as the speed of the prime mover increases above a predetermined value the lever arm 20 is moved in a counterclockwise direction thereby diminishing the supply of fuel passing through the line 15 to the prime mover 10 and thus at least tending to decrease the speed of the prime mover. Similarly, if the speed of the prime mover decreases below a pre-established value the spring 21 tends to move the lever arm 20 in a clockwise direction, thereby increasing the supply of fuel passing through the line 15 to the prime mover and thus accelerating its speed.

The output of the direct current generator 11 is connected to a variable electrical load generally indicated at 30 by means of electrical transmission network consisting of lines 31, 32 and 33, the lines 32 and 33 forming a continuous circuit as will be hereinafter described. As hereinbefore referred to, it will be noted that the speed of the unit above described will control, or at least tend to control, the supply of fuel passing through the line 15 to the prime mover 10 by means including the centrifugal governor, throttle control mechanism and associated apparatus. However, in devices of this character it is necessary that there be a variation in the speed at which the prime mover operates before there is a variation in the fuel supply. Hence, a variation in the electrical load 30 associated with the output of the generator 11 which would be reflected as an additional counter-torque imposed upon the prime mover associated with said generator, would cause a substantial decrease in the speed at which the prime mover operated, thereby increasing the fuel supply passing through the line 15 and thereby also increasing the speed at which the prime mover is operating. These operations require a finite though appreciable time between the variation in the load and restoration of the prime mover to its initial speed. It will be apparent, of course, that during this time interval a current supply fed to the electrical load would be substantially less than normal due to decrease in speed at which the generator is operating. As hereinbefore mentioned, it is a major object of the present invention to at least largely minimize this time interval, and the manner in which this is accomplished will be now described.

The helix generally designated at 40, formed of electrically conductive material, is associated with the lines 32 and 33 whereby current passing through the electrical load 30 from the generator 11 passes through said helix. It will, of course, be apparent that if desired a shunt can bypass said helix whereby a portion only of the current supplied to the load will pass therethrough. An electrically insulative tubular shell 41 is positioned within said helix and adapted to assist in supporting same, as well as electrically insulating parts of the helix from the metallic electro-magnetically sensitive core member 42, the latter being supported coaxially within the helix by means including a rod-like member 43 attached to said member 42 and slidably held in an opening formed in the supporting means generally designated at 44. The core 42 is normally held in substantially the position shown relative to the helix, preferably by means including a spring 45 positioned circumjacent the member 43 and abutting against parts of the support 44 and the member 42.

The solenoid core 42 comprises a structure substantially resembling a dash pot, the inner parts of said member 42 being removed to form a chamber substantially as shown, wherein is reciprocably mounted a piston 46 having a valved opening 47 formed therein and associated with the lever arm 20 by means of the pivoted connecting member 48. The interior of the dash pot core 42 is at least partially filled with a fluid 50, preferably air or oil, although other materials can be used as appears desirable. It will be apparent that adjustment can be made in the valved opening 47 to suit variations in viscosity of the fluid 50, whereby the rate of travel of the piston through the dash pot under a given force acting through the connecting member 48, can be regulated.

In operation, as the electrical load generally designated at 30 is increased it will be apparent that an increased current flows through the electrical network comprising the lines 31, 32 and 33, whereby the electro-magnetic flux within the helix 40 is altered to a substantially proportional extent. As the electro-magnetic flux within the helix is increased it will be apparent that there will be a tendency toward movement in a downward direction of the electro-magnetically sensitive core member 42. By adjustment of the valved opening 47 the dash pot core can be arranged whereby a substantial downward force can be exerted in the member 48 by increase in the electrical load generally designated at 30, thereby at least tending to move the lever arm 20 in a clockwise direction with concomitant increase in the supply of fuel passing to the prime mover through the feed line 15. It will be apparent, however, that the valved opening 47 can be adjusted whereby the dash pot core will effect clockwise movement of the lever arm 20 only when alterations of a predetermined character are made in the electrical load 30, that is to say, by suitable adjustment of the valve, throttle control means will be operated only upon instantaneous and substantial alterations in the load.

It is to be noted, after the initial movement of the dash pot core within the helix or solenoid, that the usual speed control of the prime mover comprising the centrifugal governor and associated apparatus, will function normally inasmuch as the piston 46 will tend to move into a position within the fluid-containing chamber whereby no stress is exerted in the connecting member 48. In the preferred application of the device according to the present invention, only substantially instantaneous increases in the electrical load upon the output of the generator will operate auxiliary speed control mechanism comprising the helix and associated apparatus. It is to be noted, however, that the auxiliary speed control means functions substantially instantaneously and to a degree directly proportional to variations in the electrical load upon the generator output, thereby at least largely minimizing the time lag between variation in the load and variation in the generator speed and without necessitating a variation in the generator-prime mover speed before a corresponding variation is made in the fuel supply.

It is to be understood that this improvement is capable of extended application and is not confined to the exact showing of the drawing nor to the precise construction descibed and, therefore, such changes and modifications may be made therein as do not affect the spirit of the invention nor exceed the scope thereof as expressed in the appended claims.

What is claimed is:

1. In a device of the type described for controlling the speed of an electrical current supply unit connected to and feeding an electrical power transmission network having an electrical load thereon subject to variations substantially unprognosticatable, said unit comprising a direct current generator and a prime mover connected with and driving said generator, mechanically operated means for regulating the speed of said prime mover, electrically controlled means associated with and adapted to independently actuate said mechanically operated means for regulating the speed of said prime mover, said electrically controlled means being associated with, connected to and forming part of said electrical power transmission network and being actuated substantially instantaneously by and in a degree proportional to any and all substantially instantaneous variations of appreciable magnitude in the electrical load on said network although being substantially unaffected by gradual variations in load and by those of relatively inappreciable magnitude, said electrically controlled means comprising a helix formed of electrically conductive material connected to said power transmission network whereby at least a portion of the current applied to said electrical load passes through said helix, a core positioned within said helix, supporting means for said core whereby said core can move coaxially relative to and within said helix though normally said core is held within said helix with a portion of said core projecting therefrom, and means connected with said core adapted to actuate said mechanically operated means for regulating the speed of said prime mover whereby said means is operated in a degree proportional to and practically simultaneously with substantially instantaneous variations of appreciable magnitude in the electrical load on said network.

2. In a device of the type described for controlling the speed of an electrical current supply unit connected to and feeding an electrical power transmission network having an electrical load thereon subject to variations substantially unprognosticatable, said unit comprising a direct current generator and a prime mover connected with and driving said generator, mechanically operated means for regulating the speed of said prime mover, electrically controlled means associated with and adapted to independently actuate said mechanically operated means for regulating the speed of said prime mover, said electrically controlled means being associated with, connected to and forming part of said electrical power transmission network and being actuated substantially instantaneously by and in a degree proportional to any and all substantially instantaneous variations of appreciable magnitude in the electrical load on said network although being substantially unaffected by gradual variations in load and by those of relatively inappreciable magnitude, said electrically controlled means comprising a helix formed of electrically conductive material connected to said power transmission network whereby at least a portion of the current applied to said electrical load passes through said helix, a core positioned within said helix, supporting means for said core whereby said core can move coaxially relative to and within said helix though normally said core is held within said helix with a portion of said core projecting therefrom, said core comprising a dash pot including a fluid-containing chamber formed of electro-magnetically sensitive material and a piston slidable therein, said piston being connected to and adapted to actuate said mechanically operated means for regulating the speed of said prime mover whereby said means is operated in a degree proportional to and practically simultaneously with substantially instantaneous variations of appreciable magnitude in the electrical load of said network.

3. In a device of the type described for controlling the speed of an electrical current supply unit connected to and feeding an electrical power transmission network having an electrical load thereon subject to variations substantially unprognosticatable, said unit comprising a direct current generator and a prime mover connected with and driving said generator, mechanically operated means for regulating the speed of said prime mover, electrically controlled means associated with and adapted to independently actuate said mechanically operated means for regulating the speed of said prime mover, said electrically controlled means being associated with, connected to and forming part of said electrical power transmission network and being actuated substantially instantaneously by and in a degree porportional to any and all substantially instantaneous variations of appreciable magnitude in the electrical load on said network although being substantially unaffected by gradual variations in load and by those of relatively inappreciable magnitude, said electrically controlled means comprising a helix formed of electrically conductive material connected to said power transmission network whereby at least a portion of the current applied to said electrical load passes through said helix, a core positioned within said helix, supporting means for said core comprising a spring pressed slidable rod-like member arranged whereby said core can move coaxially relative to and within said helix though normally said core is held within said helix with a portion of said core projecting therefrom, said core comprising a dash pot including a fluid-containing chamber formed of electro-magnetically sensitive material and a piston slidable therein, said piston being connected to and adapted to actuate said mechanically operated means for regulating the speed of said prime mover whereby said means is operated in a degree proportional to and practically simultaneously with substantially instantaneous variations of appreciable magnitude in the electrical load of said network.

4. In a device of the type described for controlling the speed of an electrical current supply unit connected to and feeding an electrical power transmission network having an electrical load thereon subject to variations substantially unprognosticatable, said unit comprising a direct current generator and a prime mover connected with and driving said generator, mechanically operated means for regulating the speed of said prime mover, electrically controlled means associated with and adapted to independently actuate said mechanically operated means for regulating the speed of said prime mover, said electrically controlled means being associated with, connected to and forming part of said electrical power transmission network and being actuated substantially instantaneously by and in a degree proportional to any and all substantially instantaneous variations of appreciable magnitude in the electrical load on said network although being substantially unaffected by gradual variations in load and by those of relatively inappreciable magnitude, said electrically controlled means comprising a helix formed of electrically conductive material connected to said power transmission network whereby at least a portion of the current applied to said electrical load passes through said helix, an electrically insulative substantially cylindrical member positioned within said helix and coaxial therewith, a core positioned within said substantially cylindrical electrically insulative member and said helix, supporting means for said core comprising a spring pressed slidable rod-like member arranged whereby said core can move coaxially relative to and within said helix though normally said core is held within said helix with a portion of said core projecting therefrom, said core comprising a dash pot including a fluid-containing chamber formed of electro-magnetically sensitive material and a piston slidable therein, said piston being connected to and adapted to actuate said mechanically operated means for regulating the speed of said prime mover whereby said means is operated in a degree proportional to and practically simultaneously with substantially instantaneous variations of appreciable magnitude in the electrical load of said network.

VERNON ROOSA.
ENGENE SILBER.